United States Patent [19]
Touchman

[11] 3,801,842
[45] Apr. 2, 1974

[54] STEPPING MOTOR
[75] Inventor: William S. Touchman, Kettering, Ohio
[73] Assignee: The National Cash Register Company, Dayton, Ohio
[22] Filed: June 27, 1972
[21] Appl. No.: 266,753

[52] U.S. Cl. .............................................. 310/49
[51] Int. Cl. .......................................... H02k 37/00
[58] Field of Search ................ 310/49 R, 164, 178

[56] References Cited
UNITED STATES PATENTS
3,560,774   2/1971   Reeves .................................. 310/49
3,293,460   12/1966  Iwai et al. .......................... 310/49 R
3,671,841   6/1972   Hoffman ........................... 310/49 X
3,327,191   6/1967   Goto .................................. 310/49 X Primary Examiner—J. D. Miller
Assistant Examiner—Robert J. Hickey
Attorney, Agent, or Firm—Wilbert Hawk, Jr.; George J. Muckenthaler; J. T. Cavender

[57] ABSTRACT

A stepping motor includes a single piece rotor with shafts connected thereto on each end of the rotor, and a pair of coils circumventing the rotor and encased within stators, which stators are positioned adjacent the rotor and spaced from each other. The energization and de-energization of the respective coils provides for one complete step of operation by the pulsing of one coil under stated conditions.

1 Claim, 6 Drawing Figures

PATENTED APR 2 1974          3,801,842

STEPPING MOTOR

BACKGROUND OF THE INVENTION

Stepping or indexing mechanisms for driving or advancing material have been used for a number of years where it has been desirable to drive or advance tapes, record material, films or the like in incremental manner without the use of complex clutch and brake mechanisms. In recent years, the use of stepping motors in the processing of data has become increasingly important by reason of the requirements for high speed operation, along with precise positioning of the data carriers during the travel thereof within the processing system. In this respect, magnetic and electromagnetic motors are commonly used to obtain the desired motion through the drive mechanism where such a mechanism is adaptable for effecting the stepping action.

One example of prior art which shows and describes a magnetic motor is U.S. Pat. No. 2,806,987, such motor being three phase and having one rotor with end stator rings and a central stator and spacers therebetween.

Another example of prior art is disclosed in U.S. Pat. No. 2,834,896 which shows a rotor, pole pieces, a laminated core with a coil, and permanent magnets.

U.S. Pat. No. 3,042,818 shows and describes a stepping motor with a rotor, a permanent magnet, and a coil wherein the coil opposes the magnetic field and creates a new effective flux path to advance the rotor.

A further example of prior art is U.S. Pat. No. 3,117,268 which shows and describes an electric motor having a rotor, a permanent magnet to magnetize end caps on the rotor, and stator rings. The control circuit enables the motor to be rotated in incremental steps in either direction and provides for each pulse signal to effect one step of the motor, and to maintain the motor energized at the last pulsed position.

Finally, U.S. Pat. No. 3,293,460 discloses an electric stepping motor with a non-magnetic spacer between adjacent rotor sections. The rotors have teeth corresponding to the stator teeth, with the teeth of one stator being displaced from the teeth of other stators.

SUMMARY OF THE INVENTION

The present invention relates to stepping motors and more particularly to a low cost stepping motor having a single rotor. The rotor carries a plurality of teeth thereon corresponding to the teeth on a pair of stators which are separated by a spacer, there being a coil generally within the confines of each stator and surrounding the rotor at spaced positions. The motor housing includes a longitudinal slot therein for stopping the flow of single turn eddy current created upon rising or falling current in the coils and the slot provides for retention of the stator laminations with respect to the housing by means of a key or other stop element.

Starting at a fixed position of the stepping motor wherein the stator teeth are displaced a half step from their respective rotor teeth, and with both coils energized, the forces from the flux lines flowing in a path intermediate certain rotor and stator teeth oppose the forces from the flux lines intermediate other rotor and stator teeth and a steady state equilibrium position is effected. Upon de-energization of one of the coils, in a manner to quickly cause the flux to go to zero, the rotor will accelerate in a predetermined direction to a next position due to the forces from the flux lines between such certain rotor and stator teeth and upon re-energization of said one coil, the rotor will be advanced one complete step.

In view of the above discussion, the principal object of the present invention is to provide a simple, low cost stepping motor.

Another object of the present invention is to provide a stepping motor having a single rotor.

A further object of the present invention is to provide a single rotor stepping motor with a pair of coils arranged to complete one step of operation of the motor upon a single coil pulse.

Additional advantages and features of the present invention will become apparent and fully understood from a reading of the following description taken together with the annexed drawings, in which.

Figure 1:
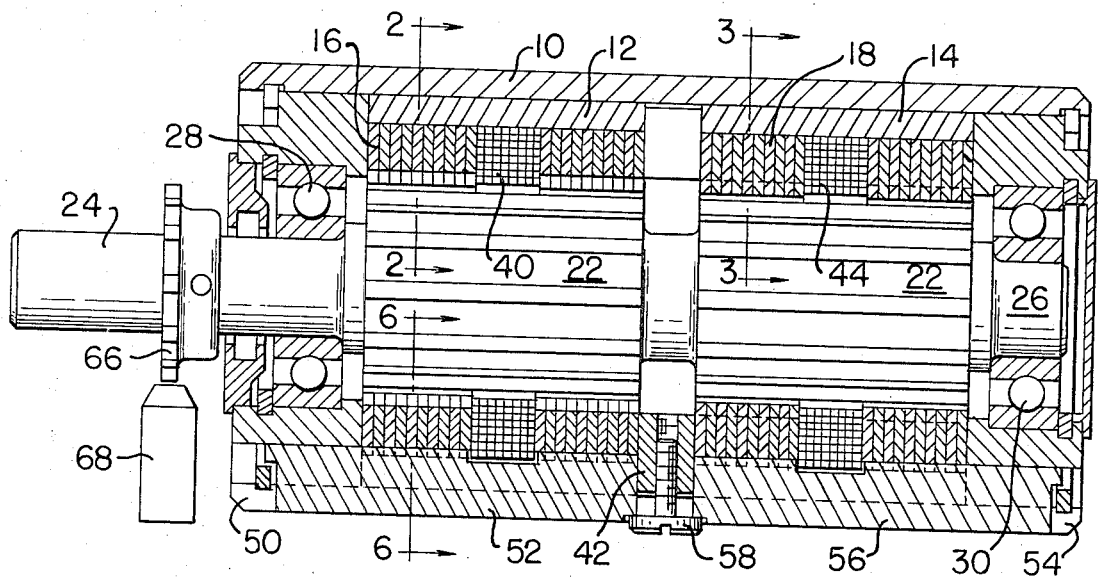
FIG. 1 is a cross-sectional view of a stepping motor made in accordance with the present invention.

Referring now to FIG. 1, a stepping motor made in accordance with the present invention has a cylindrical body 10 preferably of non-magnetic material which houses sleeves 12 and 14, which are made of mild steel or other soft, magnetic material. The sleeve 12 encloses a stator assembly 16 and the sleeve 14 encloses a stator assembly 18, each stator assembly being made of a plurality of laminations of soft, magnetic material with the laminations having a plurality of teeth 20 and 21 (see also FIGS. 2 and 3).

A single-piece rotor 22, with shaft extensions 24 and 26, is rotatably carried or journaled in ball bearings 28 and 30 contained in suitable housings of non-magnetic material. The rotor 22 includes a plurality of teeth 32 extending the length thereof and corresponding in number and construction to the teeth 20 and 21 of the stator assemblies 16 and 18. A coil 40 is positioned within the laminations of the stator assembly 16 and encircles the rotor 22 on one side of a spacer 42, and a similar coil 44 is positioned in like manner within the laminations of the stator assembly 18 and encircles the rotor 22 on the other side of the spacer 42.

As will be later explained in the operation of the stepping motor, certain constructions and features of the present device are similar to those described in a co-pending application of W. S. Touchman and J. D. Hays, and entitled "Permanent Magnet Type Torsional Stepping Motor," Ser. No. 269,477, filed July 6, 1972 now U.S. Pat. No. 3,735,165, issued May 22, 1973. In view of this, these certain constructions are therefore similar except for the elimination of the torsional member connecting separate rotors in the above-noted application.

The present motor has been designed to normally make advancing steps of 15° or 24 steps per revolution so that rotor 22 has 12 teeth 32 which extend substantially the length of the rotor 22, except for the interruption by the spacer 42, and which align with and match the 12 teeth 20 and 21 of the stator assemblies 16 and 18, respectively. When coil 40 is energized, the magnetic flux takes a path through the laminations of stator assembly 16 and through the sleeve 12, and likewise, when coil 44 is energized, the flux flow is through the laminations of stator assembly 18 and through the sleeve 14.

Figure 6:
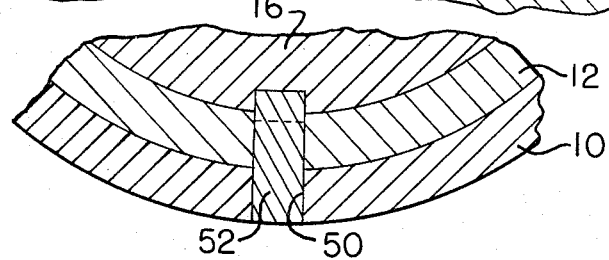
FIG. 6 is a view taken on the line 6—6 of FIG. 1.

The housing 10 has a slot 50 extending from the left-hand end thereof (FIG. 1) to the spacer 42, which slot serves two purposes, these being to prevent or stop the single turn eddy current which is created upon rising or falling current in coil 40, and the slot additionally provides seating for a key 52 (see FIG. 6) which prevents rotation of the laminations of stator assembly 16 with respect to the housing 10, as seen from the extension of the key 52 through a slot in the sleeve 12 and slots in the laminations of the stator assembly. In like manner, the housing 10 has a slot 54 extending from the right-hand end thereof (FIG. 1) to the spacer 42, which slot likewise prevents or stops eddy current flow created upon rising or falling current in coil 44, and which slot 54 provides seating for a key 56 to prevent rotation of the laminations of stator assembly 18 with respect to the housing 10, there also being a similar slot in the sleeve 14 and in the laminations of the stator assembly 18. A screw 58 is threaded into the spacer 42 and secures the keys 52 and 56 to the housing 10.

Figure 2:
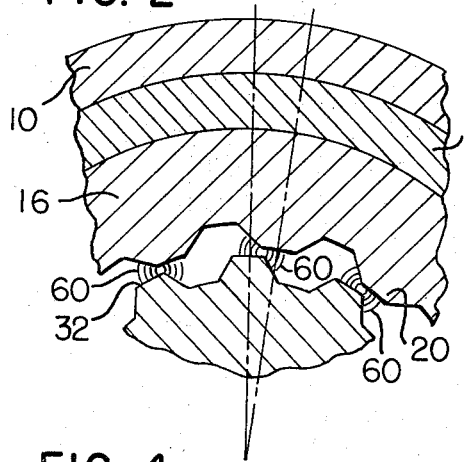
FIG. 2 is a view taken on the line 2—2 of FIG. 1.
Figure 3:
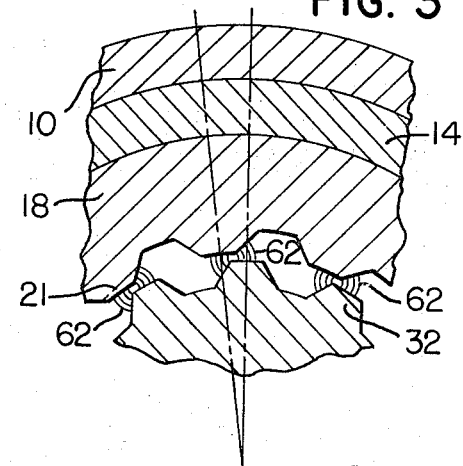
FIG. 3 is a view taken on the line 3—3 of FIG. 1.
Figure 4:
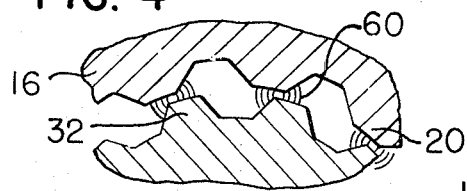
FIG. 4 is a view showing the rotor of FIG. 2 advanced one step.
Figure 5:
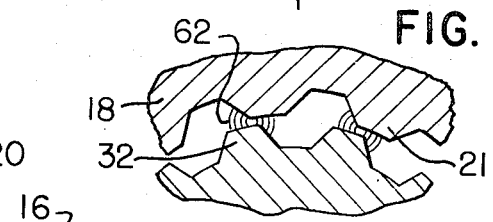
FIG. 5 is a view showing the rotor of FIG. 3 advanced one step.

The stepping motor is shown with both coils being energized, as seen from FIGS. 2 and 3 which show the fixed position of the stator teeth 20 and 21 relative to the rotor teeth 32. Looing at the left-hand end of FIG. 1, clockwise or counter-clockwise rotation of the rotor 22, and shaft extension 24, can be defined in a sequence of operation. Assuming the lines of flux, as typically represented by lines 60 and 62, are effecting the magnetic conditions between the rotor and the stator teeth, the forces from flux lines 60 (FIG. 2) oppose the forces from flux lines 62 (FIG. 3) and a steady state equilibrium position is attained. Now, if coil 44 is deenergized in a manner to quickly cause the forces of flux lines 62 to fall to near zero, with coil 40 remaining energized, the rotor 22 will accelerate clockwise an angular distance of 7½° by reason of the forces of flux lines 60, FIG. 2. When the rotor teeth 32 match with the teeth of stator assembly 16 (FIG. 2) the rotor teeth 32 will have advanced from the teeth of stator assembly 18 and be centered over the groove between the stator assembly 18 teeth. Ideally, at this point in time, coil 44 is re-energized and the rotor teeth 32 are again attracted to the teeth of stator assembly 18, the rotor having advanced one tooth in the clockwise direction as observed from the rotated position of rotor teeth 32 in relation to the stator assembly lamination teeth 20 and 21 in FIGS. 4 and 5. The rotor teeth 32 do not advance from the teeth of stator assembly 16, but they are now positioned 7½° to the right of the stator assembly 16 teeth with the flux lines 60 driving and effecting forces in the opposite direction from that shown in FIG. 2. The rotor 22 has advanced one complete step by pulsing one coil.

If, instead of coil 44 being deenergized, the coil 40 was deenergized, the rotor 22 would have accelerated or advanced in the counterclockwise direction. It is also within the scope of the present invention to step continuously in one direction by deenergizing one of the coils, then the other coil, and by alternately energizing and deenergizing the two coils, provide the stepping action.

A simple sensing device provides the control logic for determining which coil to deenergize for a given condition. In this respect, a wheel 66 having 12 teeth thereon is secured to the rotor extension or shaft 24 and made to operate a static pick-up element 68. This simpler arrangement is possible by reason of the fact that the rotor comprises only one part.

It is thus seen that herein shown and described is a simple and low cost stepping motor which utilizes a one-piece rotor, a pair of stators, and two coils for providing magnetic action between the rotor and the stators.

An additional feature of the present stepping motor is the adaptability to set a condition from the tooth displacement of 15° to one of 14½°, for example, wherein a slight asymmetry would be introduced and the rotor would advance in half steps of 7½° from the FIG. 2 position to that shown in FIG. 3 in clockwise or counterclockwise direction, as desired. Therefore, by a combination of full and half steps, any of the 48 rotary positions can be attained.

The apparatus enables the accomplishment of the objects and advantages mentioned above, and while only one embodiment of the invention has been disclosed herein, certain variations may occur to those skilled in the art. For example, a permanent magnet structure could be used in place of the coils 40 and 44 as described. It is contemplated that all such variations, not departing from the spirit and scope of the invention hereof, are to be construed in accordance with the following claims.

What is claimed is:

1. A stepping motor comprising a housing, a
   sleeve within the housing, a
   single rotor journaled in said housing, a
   pair of spaced stator assemblies and a pair of electromagnetic coils operably associated therewith and encircling the rotor, each of said stator assemblies substantially encompassing its respective electromagnetic coil for providing a path of flux therefrom through laminations of the respective stator assembly to a portion of the rotor and through said sleeve to complete said path, a spacer encircling said rotor and separating said stator assemblies for permitting energization and deenergization of one of said coils in successive manner,
   means including a toothed wheel secured to said rotor for determining energization of a respective coil, key and slot means in said housing and said laminations for preventing rotation of said laminations with respect to said housing upon energization of said electromagnetic coils whereby with both coils in the energized condition,
   deenergization of said respective coil permits rotation of said rotor a predetermined angular distance, said other coil effecting additional angular rotation of said rotor, and energization of said respective coil effecting completion of one step of operation, and
   means connecting said spacer and said housing for retaining said key means in position.

* * * * *